United States Patent

[11] 3,591,754

[72] Inventor Charles L. Baldwin, Jr.
Penfield, N.Y.
[21] Appl. No. 795,246
[22] Filed Jan. 30, 1969
[45] Patented July 6, 1971
[73] Assignee Eastman Kodak Company
Rochester, N.Y.

[54] APPARATUS FOR STRIPPING WIRE BY WIRE-IN-CIRCUIT HEATING
2 Claims, 2 Drawing Figs.

[52] U.S. Cl. .............................................. 219/50,
81/9.51, 219/68, 219/74, 219/234
[51] Int. Cl. .............................................. H02g 1/12
[50] Field of Search .................................. 219/68, 50,
58, 234, 74; 81/9.5 B, 9.5 C, 9.51

[56] References Cited
UNITED STATES PATENTS

| | | | |
|---|---|---|---|
| 1,089,786 | 3/1914 | von Pirani .................. | 219/74 X |
| 1,354,266 | 9/1920 | Plant ......................... | 219/74 |
| 2,415,669 | 2/1947 | Beuschel .................... | 81/9.51 |
| 2,807,705 | 9/1957 | Arrain ........................ | 219/68 |
| 2,636,408 | 4/1953 | Mitchell ..................... | 81/9.51 X |
| 3,374,117 | 3/1968 | Savage ....................... | 81/9.51 X |
| 3,384,958 | 5/1968 | Christian et al. ............ | 219/58 X |

Primary Examiner—R. F. Staubly
Attorneys—Robert W. Hampton and James J. Wood

ABSTRACT: The disclosure relates to a method and an apparatus for removing insulation from an electrical wire by electrical resistance heating of the wire to vaporize the insulation, the entire operation being conducted in an inert atmosphere for those applications where oxidation of the bare electric wire would be harmful.

PATENTED JUL 6 1971

3,591,754

INERT GAS IN

CHARLES L. BALDWIN JR.
*INVENTOR.*

BY *James J. Wood*

*Robert W. Hampton*
ATTORNEYS

3,591,754

APPARATUS FOR STRIPPING WIRE BY WIRE-IN-CIRCUIT HEATING

BACKGROUND OF THE INVENTION

1. Field of the Invention

This invention relates to a method for stripping insulation coating from a wire by means of electrical resistance heating.

2. Description of the Prior Art

The problem of stripping insulation from conductive wire presents myriad problems to the industry because of the different fabricating methods utilized by manufacturers, and also because of the variety of insulation materials utilized such as: thermosetting materials, wrapped insulation, glass braid, asbestos, and so forth. The permutations and combinations of fabricating methods and selection of materials require the ultimate user to adapt the stripping operation to the various manufacturing specifications and materials available in the commercial market.

Varnished insulation, such as frequently used on magnetic wire, presents problems peculiar to itself. The varnish forms a very strong adhesive bond with the conductor proper. The prior art has taught the removal of this coating by abrasive or chemical techniques; both of these techniques must be used with extreme care to avoid deleterious effects to the tensile strength of the exposed conductor.

SUMMARY OF THE INVENTION

The instant invention provides a method for stripping insulated conductive wire by passing an electric current through the portion of the wire to be stripped to generate sufficient heat so that the insulation material is removed by vaporization.

Apparatus in accordance with the invention for practicing this method includes in a preferred embodiment, support means for receiving the insulated conductor wire. A pair of electrodes, positioned in spaced relationship, at a predetermined distance from each other determined by the length of wire to be stripped, is adapted to be controllably displaced toward the support means so as to cut through the outer insulation and make electrical contact with the conductive wire. Means are provided for passing electric current through the electrode pair of a time to generate sufficient heat to remove the insulation material by vaporization.

In those applications where oxidation of the bare conductor would be detrimental, the method and apparatus of the instant invention makes provision for the operation of stripping to be conducted in an inert atmosphere.

It is an object of this invention to provide a method for effectively removing insulation from an electrical conductor without doing damage to its tensile strength.

It is a further object of this invention to provide an apparatus for quickly and effectively removing insulation from an electrical conductor without doing damage to its tensile strength.

The invention is more particularly described and illustrated in connection with the accompanying drawing which shows diagrammatically an embodiment of the invention.

DESCRIPTION OF THE PREFERRED EMBODIMENT

Figure 1:
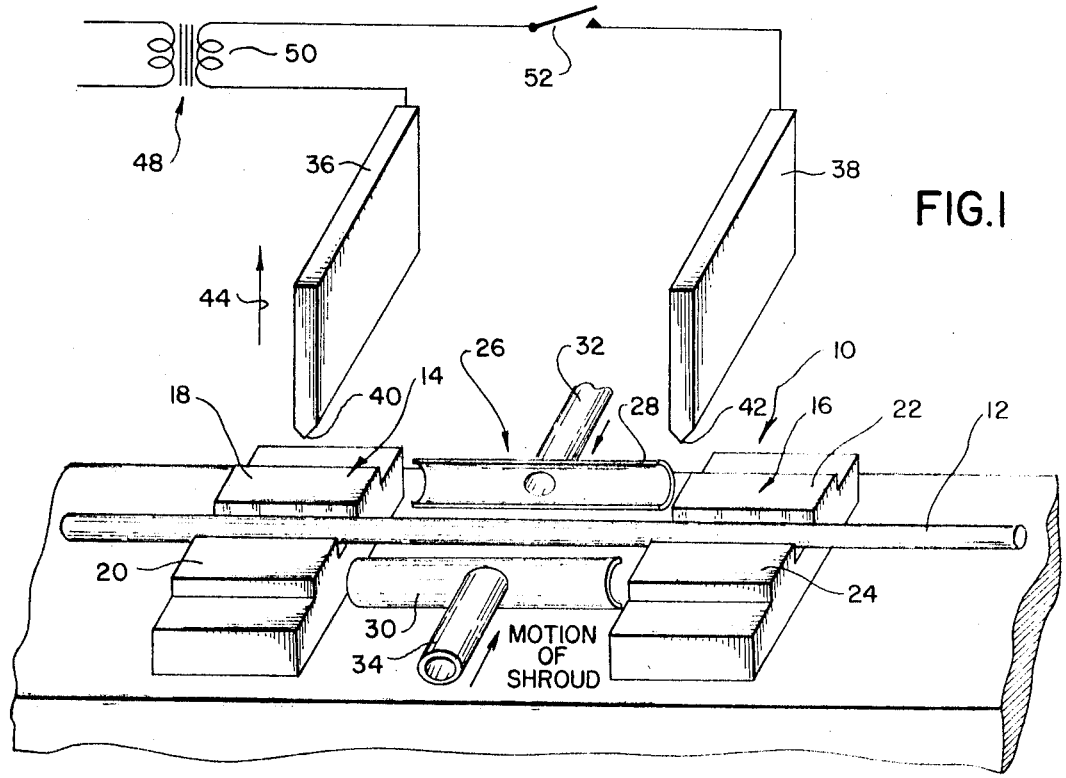
FIG. 1 is a pictorial view showing the apparatus of this invention for practicing the method of the instant invention, the apparatus being in standby position.
Figure 2:
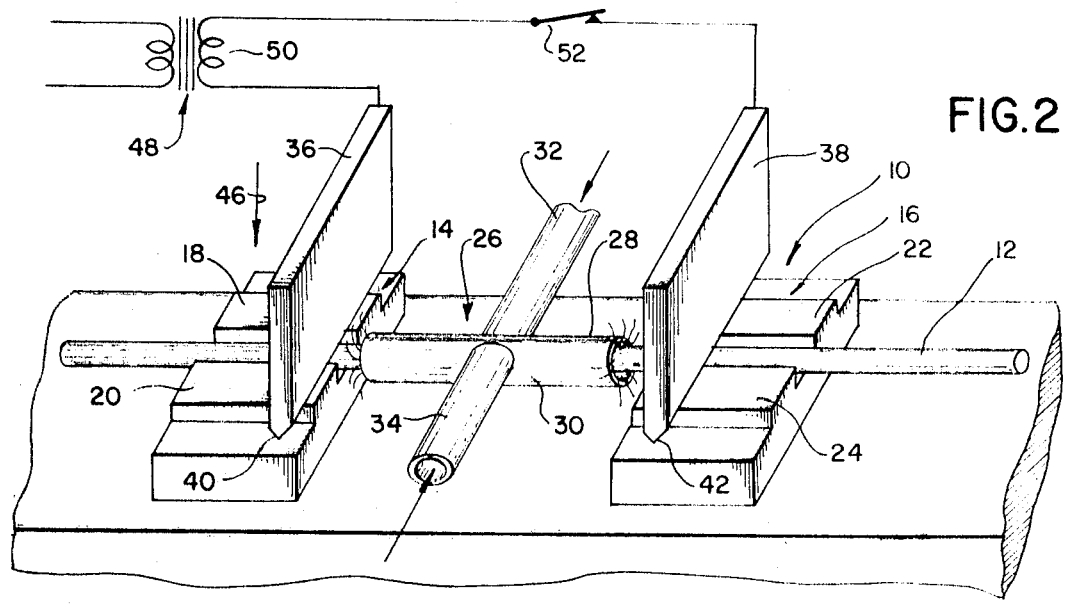
FIG. 2 is a similar pictorial view, showing the apparatus depicted in FIG. 1 in the dynamic or operating position.

The wire stripping apparatus of the invention is arranged at a work station 10 which is part of an automated manufacturing operation. The insulated wire 12 is longitudinally displaced by any convenient means until it comes to rest on supporting means indicated at 14, 16, the supports being located in the spaced relationship to each other, the exact spacing depending upon the length of insulation required to be stripped. The support nests 14, 16 include surfaces at 18, 20; 22, 24, respectively, which are slightly lower than the crest of the insulated wire 12 for reasons which will shortly be made apparent.

During the heat of stripping, oxidation of the exposed wire conductor could take place. Oxidation may be avoided by using silver clad wire, or the stripping operation may be accomplished in an inert gas atmosphere. In the illustrative embodiment shown, the stripping operation is accomplished in an inert gas atmosphere. A shroud indicated generally at 26, with half sections at 28, 30, is arranged to form a covering for the wire 12 to provide the inert atmosphere during stripping. The half sections 28, 30 are provided with inlets at 32, 34 through which an inert gas is forced at the proper time.

Electrodes 36, 38 having knife edges at 40, 42 are conveniently arranged along the path of wire travel and are adapted for bilateral displacement in the directions indicated by the arrows at 44, 46. A transformer is indicated generally at 48, the transformer secondary 50 being connected across the electrodes 36, 38 through a switch indicated symbolically at 52.

OPERATION OF THE DEVICE

In FIG. 1 the apparatus is shown poised for stripping, the wire 12 having been advanced by any convenient means not shown in the drawing. Next the half sections 28, 30 are brought together so as to form approximately a cylindrical covering, closed about the portion of the wire to be stripped, with open ends to permit escape of the inert gas. The atmosphere enclosed within the shroud 26 is then purged with a quick puff of an inert gas such as nitrogen for example. Simultaneously with this operation, the electrodes 36, 38 descend to the surfaces 18, 20; 22, 24 of the nests 14, 16 and as mentioned previously since these surfaces are slightly lower than the crest of the wire 12, the edges 40 and 42 pierce the insulation and nick the wire establishing electrical continuity. At the proper time, the switch 52 is closed and the electrical path is completed through the wire 12. The resulting current through the wire between the knife edges 40, 42 of the electrodes provides sufficient heat to the insulation to effect its removal by vaporization.

In one working embodiment, a 2¾ inch span of 0.005 diameter copper wire, was stripped by the application of a potential of 2.8 volts AC applied for 0.62 seconds.

The invention has been described in detail with particular reference to preferred embodiments thereof, but it will be understood that variations and modifications can be effected within the spirit and scope of the invention.

I claim:

1. Apparatus for stripping insulated conductive wire comprising:
   a. support means for receiving said insulated wire;
   b. a pair of electrodes positioned normal to said wire and at a predetermined distance from each other determined by the length of wire to be stripped, and adapted to be controllably displaced toward said support means a predetermined distance so as to cut through the insulation and make electrical contact with said conductive wire; and
   c. means for passing sufficient electric current through said electrode pair to quickly remove the insulation by vaporization.

2. Apparatus for stripping insulated conductive wire comprising:
   a. support means for receiving and supporting said insulated conductive wire;
   b. a pair of electrodes positioned normal to said wire, and in predetermined spaced relationship, the predetermined space depending upon the length of insulation to be stripped, and adapted to be controllably displaced toward said support means a predetermined distance so as to cut through the insulation and make electrical contact with said conductive wire;

c. means for periodically supplying an inert atmosphere at the region of said length of insulation to be stripped; and d. means for passing sufficient electric current through said electrode pair during the presence of said inert atmosphere to quickly remove the insulation by vaporization.